April 17, 1928.  A. A. STEINHILBER  1,666,074
STOCK STORAGE APPARATUS
Filed June 6, 1927
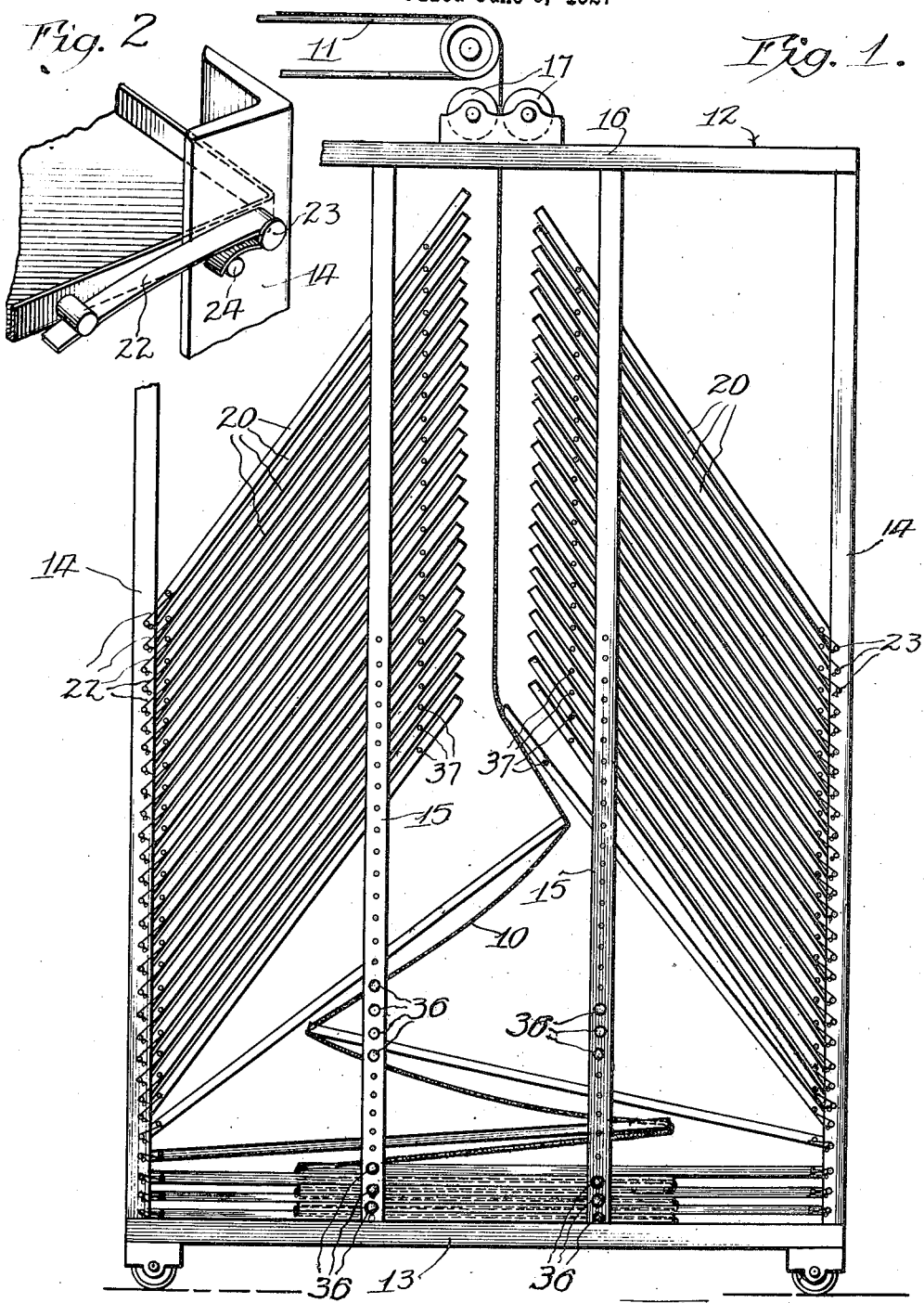

Patented Apr. 17, 1928.

1,666,074

UNITED STATES PATENT OFFICE.

ADOLF A. STEINHILBER, OF ROCK ISLAND, ILLINOIS.

STOCK-STORAGE APPARATUS.

Application filed June 6, 1927. Serial No. 196,987.

This invention relates to improvements in apparatus for handling and storing plastic sheet materials, and is especially adapted for long lengths of material such as raw rubber or the like, which requires especially careful handling to avoid stretching, pressing, contact with adjacent layers, or any similar agency tending to distort the proper shape or form of the material as it is delivered from the forming rolls or the like.

The principal object of my invention is to provide an improved form of apparatus whereby long lengths of such plastic material such as above mentioned may be stored safely and retained in proper form ready for withdrawal and use when desired.

My invention may best be understood by referring to the accompanying drawings, in which Figure 1 is a side view of a storage frame or truck constructed in accordance with my invention, and showing the method of loading or unloading the sheet material thereon, Figure 2 is an enlarged detail view showing the construction of the spring tension means associated with the several supporting trays on the device shown in Figure 1.

Referring now to details of the apparatus shown in the drawings, the plastic material, herein in the form of a continuous length of raw rubber 10, is delivered from a suitable calender (not shown) over a delivery table comprising an endless belt 11, to the storage apparatus 12. As shown herein, said apparatus comprises a wheeled platform 13 having an upright frame including four corner uprights 14, 14, intermediate uprights 15, 15, and an upper frame 16. The truck may be of any length to accommodate the width of stock desired. A pair of oppositely disposed rollers 17, 17, are centrally mounted on the upper frame 16 to guide the sheet of stock as it is loaded on or withdrawn from the device.

The stock is supported by a plurality of trays, 20, 20, arranged in two sets hinged on opposite corner uprights 14, 14, and each set extending toward and interleaved alternately with the trays of the opposite set in closely interposed relation when the trays are in horizontal position, but leaving sufficient space between adjacent trays to accommodate the single thickness of the rubber stock without pressure on the latter.

In the preferred form shown, each of the trays is provided with spring tension means, herein including a pair of springs 22, 22, passing over its adjacent pivot pin 23 and having one end secured to the side of the tray and the other end engaging a stop 24 on the upright 14.

The tension on each pair of springs is sufficient to hold and support its respective tray in upwardly inclined position when no weight is placed thereon, but not sufficient to support any added weight, as when the stock is loaded thereon. Thus, in Figure 1, the lowermost, horizontally disposed trays are shown in loaded position, while the upper inclined trays are empty and are maintained in raised position by the tension means just described, or its equivalent.

Suitable supporting and locking means may also be provided to hold the trays in lowered position, and spaced the proper distance apart, herein said means including a series of sliding pins 36, 36, disposed on the intermediate uprights 15, 15, and arranged to be movable into holes 37, 37, on the sides of said trays and detachably engage the same, each in their proper position when loaded.

The operation of the apparatus will now be understood. The sheet material is fed from the delivery belt 11 through guide rollers 17, 17, disposed centrally of the frame, and as fast as it is fed, the two sets of trays 20, 20, are alternately lowered beginning with the lowermost trays, so as to form the stock in recurrent folds between the interleaved trays, as clearly shown in Figure 1. The locking pins 35, 35, or their equivalent, support the trays so that no pressure is exerted on the various layers of stock. In this manner a continuous length of stock can be stored, ready to be withdrawn when required, by simply reversing the process described for loading the truck.

While I have illustrated and described the particular embodiment of my invention, it will be understood that I do not wish to be limited to the exact construction shown and described, but that various changes and modifications may be made without departing from the spirit and scope of the invention.

I claim:

1. In a stock handling apparatus, a frame, two sets of trays each extending inwardly toward each other so as to be alternately interleaved with each other when in substantially parallel position, and means permitting said trays to be separated to permit loading or unloading of a single length of stock in recurrent folds between said interleaved trays.

2. In a stock handling apparatus, a frame, two sets of trays each pivotally connected to said frame along their outer edges and extending inwardly toward each other so as to be alternately interleaved with each other when in substantially parallel position, and means for selectively holding said trays in raised position to permit loading or unloading stock in recurrent folds between said trays.

3. In a stock handling apparatus, a frame, two sets of trays each pivotally connected to said frame along their outer edges and extending inwardly toward each other so as to be alternately interleaved with each other when in substantially parallel position, and tension means for swinging said trays into raised position to permit loading or unloading stock in recurrent folds therebetween.

4. In a stock handling apparatus, a frame, two sets of trays each pivotally connected to said frame along their outer edges and extending inwardly toward each other so as to be alternately interleaved with each other when in substantially parallel position, tension means for swinging said trays into raised position to permit loading or unloading stock in recurrent folds therebetween, and supporting means for holding said trays in lowered position during loading thereof.

5. In a stock handling apparatus, a frame, two sets of trays each pivotally connected to said frame along their outer edges and extending inwardly toward each other so as to be alternately interleaved with each other when in substantially parallel position relative to each other, and tension means for swinging said trays into raised position when empty to permit loading or unloading stock in recurrent folds therebetween, but being insufficient to support its respective tray when loaded.

Signed at Rock Island, Ill., this 31st day of May, 1927.

ADOLF A. STEINHILBER.